Aug. 6, 1957  C. MARCHETTI  2,801,551
DIFFERENTIAL TRANSMISSION MECHANISM
Filed Nov. 25, 1955  2 Sheets-Sheet 1
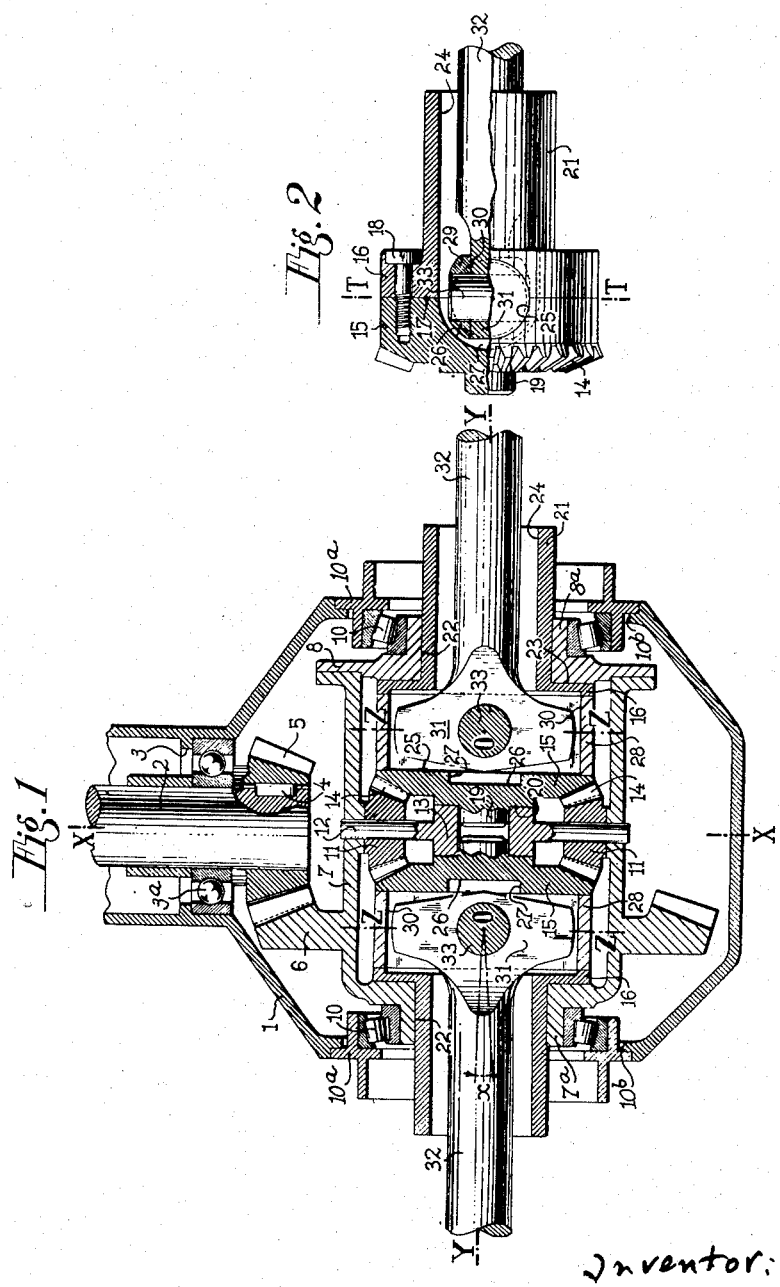
Inventor:
Carlo Marchetti
by: [signature]
Attorney

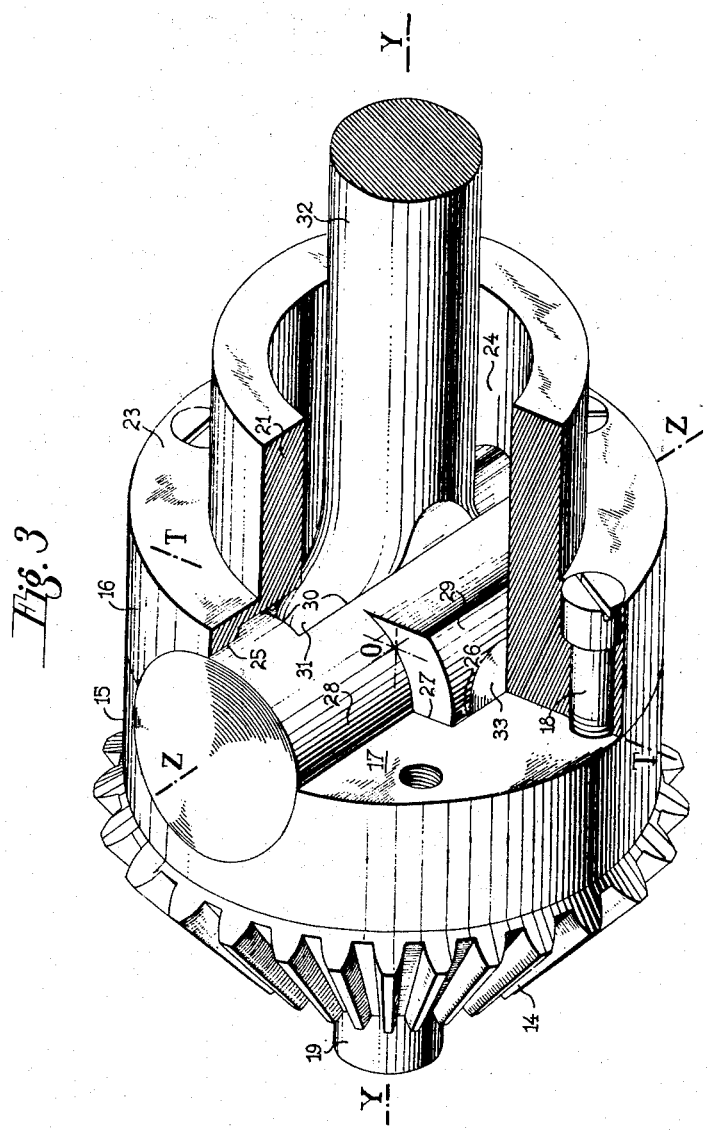

United States Patent Office 2,801,551
Patented Aug. 6, 1957

2,801,551

DIFFERENTIAL TRANSMISSION MECHANISM

Carlo Marchetti, Paris, France, assignor to Compagnie de Pont-A-Mousson, Nancy, France, a French body corporate Application November 25, 1955, Serial No. 549,147

Claims priority, application France November 30, 1954

1 Claim. (Cl. 74—713)

The object of the present invention is to provide a differential transmission mechanism, for an automobile or other machine, which is capable of resisting the axial thrusts of the wheel axle shafts, thus permitting dispensing with the flared tubes which in conventional structures surround said wheel axle shafts and serve to transmit said thrusts, and which is furthermore capable of directly driving said wheel axle shafts without need for intermediate shafts. A particular object of the invention is to provide a differential transmission mechanism in which each of the two sun gears of the differential is directly connected by a universal joint to the corresponding output shaft, which is free to swing about the centre of this universal joint relative to the differential elements surrounding it, each sun gear bearing, through an abutment, against the differential housing so as to transfer thereto the longitudinal thrusts directly transmitted to said sun gear by said output shaft.

Further features and advantages of the invention will be apparent from the ensuing description.

In the accompanying drawings, to which the invention is in no way restricted:

Fig. 1 is a longitudinal sectional view of a differential transmission mechanism embodying the invention;

Fig. 2 is a partial elevational and sectional view, taken at 90° to Fig. 1 of one of the two output shafts and the associated elements, and Fig. 3 is a perspective view, with a portion cut away, of the connection between one of said output shafts and one of the sun gears of the differential.

In the embodiment of the invention shown in the figures, the mechanism comprises a housing 1 having a plane of symmetry XX. A propeller shaft 2, having its axis in the plane XX, extends into this housing through an aperture 3 and is journalled in this housing by means of an antifriction bearing 3ª. Keyed at 4 to the end of this shaft in the housing 1 is a bevel gear or driving pinion 5. The latter meshes with a gear 6 which is disposed at right angles to the gear 5 and is rigid with a planet gear carrier 7. The latter is in the form of a case having attached thereto a side member 8. This planet gear carrier is journalled in the housing 1 for rotation about an axis YY perpendicular to the plane XX, by means of spigots 7ª, 8ª, provided on the case and the side member 8, and two conical anti-friction bearings 10, which serve at the same time as thrust bearings for maintaining the planet gear carrier in position, in the direction of the axis YY, relative to the housing 1. The bearings 10 are disposed in cups 10ª fixed by screws or bolts, not shown in the drawings, to the side walls of the housing 1, large apertures 10ᵇ concentric with said bearings being provided in said side walls.

Disposed inside the planet gear carrier are bevel planet gears 11, for example two gears, which are freely rotatable on journals 12 disposed in the plane XX. These journals are carried by the carrier 7 and are rigid with a central cylindrical ring 13 co-axial with said carrier.

The planet gears 11 mesh with the teeth 14 of two sun gears which are disposed at 90° to these planet gears on either side of the plane XX and are concentric with the axis YY.

Each sun gear is a cylindrical unit having two elements 15 and 16 (see Figs. 2 and 3) the joint plane 17 between these elements being perpendicular to the axis YY. The elements 15 and 16 are held together by, for example, screws 18. The teeth 14 are formed on the element 15. The latter comprises a central cylindrical spigot 19, which extends into a bore formed in the ring 13, and an annular shoulder which bears against a corresponding shoulder 20 formed on the ring 13.

The other element 16 also has a central cylindrical spigot 21 which is journalled in a bore 22 formed in the spigot 7ª of the case 7 or in the spigot 8ª of the side member 8, these bores being coaxial with these spigots. The element 16 also has an annular shoulder which bears against a corresponding inner face 23 formed in the case 7 or the side member 8. A bore 24 is provided in the element 16 along the axis YY.

Each sun gear (15, 16) is provided with a diametral bore 25 whose axis ZZ is disposed in the joint plane 17. Coaxial with the bore 25 and in the region of the intersection point O of the axes YY and ZZ is an arcuate recess 26 which has a radius greater than half the diameter of the bore 25 and which forms with the latter two shoulders 27. Journalled in the bore 25 is a cylindrical member 28 which comprises at its center an enlarged cylindrical bearing or flange 29 the shoulders of which bear against the shoulders 27 which thus form abutments. The member 28 is provided with a rectangular aperture or slot 30 disposed in a direction parallel to the axis ZZ, the end 31 of the corresponding output shaft 32 being freely movable in this aperture. To this end, the end 31 is flared in one direction and flattened in a direction perpendicular to the latter so that its thickness corresponds to the width of the slot 30. The end 31 is connected to the member 28 by a transverse journal or pin 33 whose axis TT passes through the point O and is perpendicular to the axes YY and ZZ, the shaft 32 being capable of pivoting about this journal. The member 28 and the journal 33 thus form the two pivot axes of a Cardan joint. It will be noticed that the rest of the shaft 32, and in particular the portion of the latter which extends into the bore 24 of the element 16, has a diameter which is distinctly smaller than that of the bore 24. Each shaft 32 may therefore be designated as a bare shaft.

By means of this arrangement each bare shaft 32, which drives a wheel of the vehicle or other machine, is directly connected for rotation with the corresponding sun gear, since the end 31 of this shaft is disposed in the slot 30. Moreover, a positive connection is obtained between the shaft 32 and the sun gear (15, 16), in the axial direction of the shaft, by means of the journal 33, the member 28 being rotatable about the axis ZZ and the end 31 being rotatable about the axis TT which is perpendicular to the axis ZZ. As a result of this positive connection:

(a) When the bare shaft 32 is driven in rotation it is capable of pivoting about the point O on the axis YY; thus, a movement over an angle x (Fig. 1) is possible, this angular movement being limited by, for example, auxiliary abutments, not shown in the drawing, situated in the vicinity of the corresponding wheel. This arrangement therefore permits an up and down movement of the wheel driven by this shaft.

(b) The forces due to the axial thrusts in either direction, to which the shaft 32 may be subjected, are wholly transmitted to the differential housing 1 through the medium of, firstly, the abutment faces 20 or 23, which serve as axial supports for the corresponding sun gear unit (15, 16), and, secondly, the conical anti-friction bearings 10 by means of which the planet gear carrier and its side member 8 are journalled in the housing. The differential is therefore capable of withstanding the axial thrust from the wheel axle shafts 32 which renders conventional flared axle tubes unnecessary.

(c) The arrangement of the invention permits the elimination of the intermediate output shaft, which in differential arrangements of known type generally serves as a connection between each sun gear and the corresponding wheel axle shaft, since the universal joint, which usually connects this intermediate shaft to the wheel axle shaft, is disposed directly on the sun gear. This arrangement permits increasing the length of each wheel axle shaft 32 and thus reducing the amplitude of its angular displacement due to the up and down movements of the wheel relative to the differential.

The mechanism embodying the invention is simple and particularly strong.

Although a specific embodiment of the invention has been described hereinabove, it must be understood that many modifications and changes may be made therein without departing from the scope of the invention defined in the appended claim.

Having now described my invention what I claim as new and desire to secure by Letters Patent is:

Transmission mechanism for automobile vehicles or other machines, comprising in combination: a rotatable longitudinal driving shaft; two transverse, bare, rotatable, driven output shafts, subjected to axial thrusts and particularly to inward push thrusts; a differential adapted to connect said three shafts in rotation by planet- and sun-gear motions; said differential comprising a housing into which each of said three shafts penetrates at one of its ends, said driving shaft being journalled in said housing whereas said bare driven shafts extend within said housing with a surrounding clearance which permits each driven shaft to oscillate angularly around a corresponding fixed oscillation point; in said housing, a rotatable planet gear carrier, a gear train connecting said gear carrier to said end of said driving shaft, planet gears freely rotatable on said planet gear carrier, two sun gears journalled in said housing for rotary motion about a common transverse axis and meshing with said planet gears; two universal joinnts each having two journals forming a rigid cross-member for positively connecting in said housing one of said output shafts to one of said sun gears; each universal joint comprising a cross-piece forming a first and a second journal perpendicular to each other, said first journal journalling in said sun gear around an axis perpendicular to the common axis of rotation of the sun gears and comprising a longitudinal slot; said second journal extending through said slot and having its axis perpendicular to the plane formed by the axis of said first journal and said axis of rotation of the sun gears; the end of the output shaft which is in said housing terminating in the shape of a flattened head which is mounted rotative around said second journal and which is engaged without transversal play in said slot, said head oscillating in said slot while being connected to said first journal during the oscillations of the latter in the sun gear; whereby, on the one hand, said sun gear drives said output shaft in rotation while said output shaft can oscillate angularly around the center of of said universal joint, and on the other hand said output shaft transmits axial thrusts to said sun gear through said universal joint; and two abutments of opposite directions between each sun gear and said housing for transferring to said housing said axial thrusts exerted by each output shaft on the corresponding sun gear.

References Cited in the file of this patent
UNITED STATES PATENTS

| 1,300,359 | Duer | Apr. 15, 1919 |
| 2,102,973 | Porsche | Dec. 21, 1937 |

FOREIGN PATENTS

| 70,176 | Netherlands | May 16, 1952 |
| 102,672 | Austria | Mar. 10, 1926 |
| 240,451 | Great Britain | July 29, 1926 |
| 488,396 | Germany | Dec. 27, 1929 |